June 9, 1942.
C. D. FINLEY
2,285,961
PISTON RING AND SEALING MEANS THEREFOR
Filed May 9, 1941
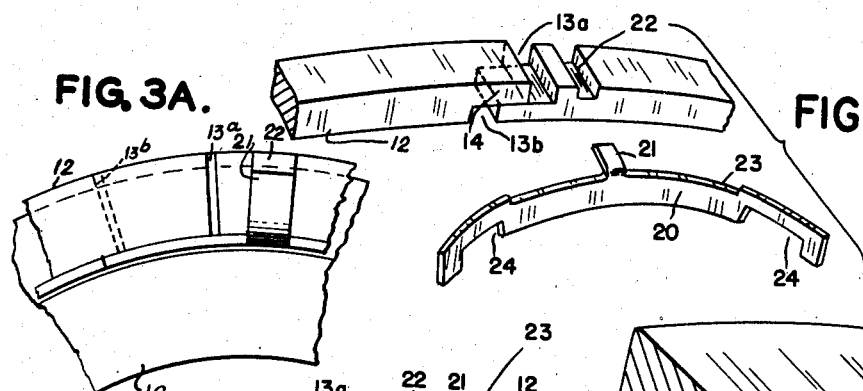
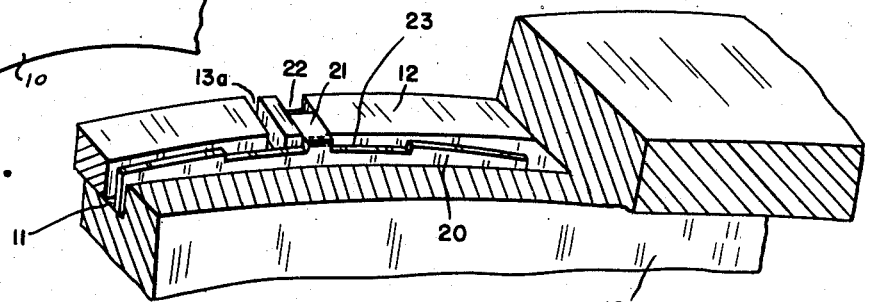
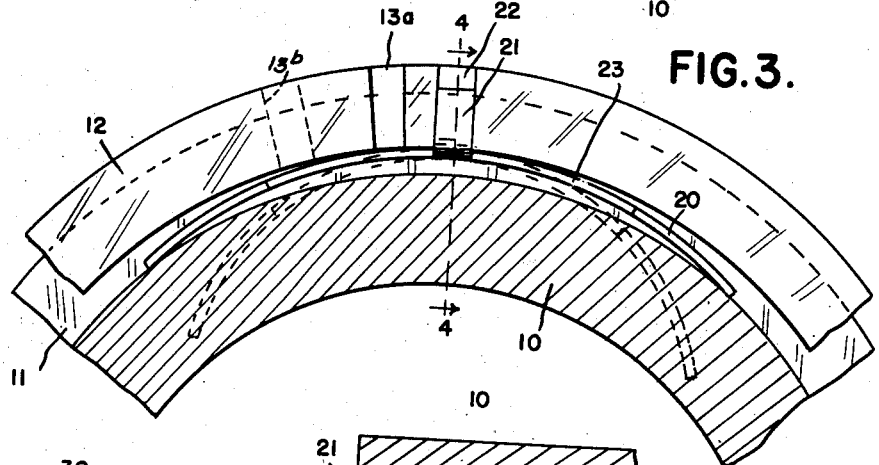
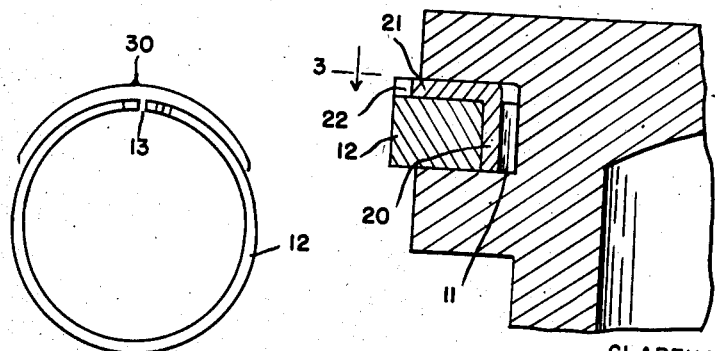
INVENTOR.
CLARENCE D. FINLEY
BY
ATTORNEYS Patented June 9, 1942

2,285,961

UNITED STATES PATENT OFFICE 2,285,961

PISTON RING AND SEALING MEANS THEREFOR

Clarence D. Finley, Detroit, Mich.

Application May 9, 1941, Serial No. 392,701

3 Claims. (Cl. 309—47)

The present invention relates to piston rings, and sealing means therefor, adapted particularly for use in internal combustion engines, pumps or the like wherein considerable gas pressures are developed.

Among the objects of the invention is a piston ring which will entirely prevent blow-by of gases under pressure and thereby increase the efficiency of an engine or pump.

Another object is a means for supporting the ends of the ring to prevent "flutter."

Still other objects will readily occur to those skilled in the art upon reference to the following description and the accompanying drawing in which Figure 1 is a perspective view of the opened ends of a ring and the sealing means.

Figure 2 is a perspective view of a portion of a piston showing the ring in position.

Figure 3 is a sectional view on line 3—3 of Figure 4.

Figure 3A is another view of a part of Fig. 3, but with the parts in the position assumed in a cylinder.

Figure 4 is a sectional view on line 4—4 of Figure 3.

Figure 5 is a plan view of a ring on a somewhat smaller scale.

In the drawing there is shown at 10 a portion of a piston and one of the ring grooves 11, it being understood that the usual piston for either an internal combustion engine or pump may be or is provided with several grooves each adapted to receive a suitable packing ring, and, since these grooves and rings may be identical, only one is being shown and described.

The ring 12 consists usually of cast iron and circular with a radius somewhat larger than the radius of the bottom of groove 11 and provided with a gap 13 serving to allow the ring to be pushed over the piston and dropped into the groove and also allowing the ring to be compressed so that the piston and rings may be inserted in a cylinder. Further, the gap 13 must be of such length that the ends of the ring do not come together when the rings expand under heating. Because of this latter requirement, the gap would offer an opportunity for gases to blow by the rings if no provision were made to prevent it.

For this reason, one of the common forms of ring has its ends "step cut" as shown at 14 so that the ends overlap when the ring is compressed. This prevents a clear passage for gas lengthwise of the piston through the gap, but does not prevent travel of gas radially to the groove and then out again through the two small gaps 13a and 13b.

In the present invention, means is provided to prevent this radial passage of the gases and thereby complete the seal. This means is shown at 20 and consists of a short flat piece of spring considerably less than that of the piston and adapted to be placed in the ring groove behind the ring gap as indicated in Figures 2 to 4.

This member 20 is provided with a tongue 21 extending outward and arranged to cooperate with a small groove or slot 22 cut across near one end of the ring 12 in order to prevent relative movement of the ring and member during use. Further, the member 20 is relieved along its upper edge at its central portion as at 23 and along its lower edge near the ends as at 24, these reliefs being for two separate purposes. The relief 22 is for the purpose of allowing gases entering gap 13a to pass behind the member and help to maintain its pressure against the ring ends over the gap. The reliefs 24 have two functions—they somewhat weaken the ends of the spring and thereby provide for the greatest strength in the midportion, and they control the tilting of the spring member so as to maintain the tongue 21 in the groove 22.

Since the usual ring is uniform in width and of such a dimension as to extend from the bottom of the groove to a short distance beyond the groove, provision must usually be made for accommodating the member 20, which is of substantial thickness.

When necessary, therefore, the ring may be relieved, as indicated in Figure 5, by cutting down its width at the portion indicated by the bracket 30 by removing some of the metal on the inner side.

It should be noted that the width of member 20 should be substantially that of the thickness of ring 12 and that it should also be made as not to weaken it in its central portion.

While the device is designed primarily for use in sealing against gas pressure, it may also be used with advantage with the so-called "oil ring" to prevent passage of oil by said ring, by installing the ring and member 20 in inverted position, i. e., with the groove 22 underneath.

Further, the spring member 20 may be used with advantage with other than "step cut" rings, since it supports the ring ends against "flutter" and also prevents ring groove leakage.

Such uses are contemplated and are to be considered within the scope of the appended claims.

I claim:

1. Sealing means for a step cut piston ring, the step cut ends being normally separated a short distance, said means consisting of a short spring member adapted to be placed behind said separated ends and bent on an arc of smaller radius than that of the ring, said member having means for fixing its position with relation to the ring and being relieved on one edge at the portion opposite said ends.

2. In combination a step cut piston ring having a groove cut radially near one of its ends and a sealing member therefor consisting of a spring member adapted to be positioned behind the gap in said ring, said member being bent on an arc of shorter radius than that of the ring and having a radially arranged tongue adapted to lie in said groove to fix the ring and member against relative movement, said member extending to the bottom of the ring but spaced from the top thereof at the portion opposite the ring gap.

3. In combination with a step cut piston ring having a groove cut radially near one of its ends and a sealing member therefor consisting of a spring member adapted to be positioned behind the gap in said ring, said member being bent on an arc of shorter radius than that of the ring and having a radially arranged tongue adapted to lie in said groove to fix the ring and member against relative movement, said member extending to the bottom of the ring but spaced from the top thereof at the portion opposite the ring gap, said member having its metal so disposed that its greatest resistance to bending is in that portion opposite said gap.

CLARENCE D. FINLEY.